(12) United States Patent
Benson et al.

(10) Patent No.: US 6,486,823 B1
(45) Date of Patent: Nov. 26, 2002

(54) ADAPTIVE CROSS POLARIZATION ELECTRONIC COUNTERMEASURES SYSTEM

(75) Inventors: Mickey Benson, Oxnard, CA (US); Eugene Clark Ball, Oxnard, CA (US); Emery Kujiraoka, Port Hueneme, CA (US); Ben Rasnick, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1695 days.

(21) Appl. No.: 08/738,923

(22) Filed: Oct. 28, 1996

(51) Int. Cl.$^7$ .............................. G01S 7/38; H04K 3/00
(52) U.S. Cl. ......................................... 342/14; 342/188
(58) Field of Search ............................ 342/14, 13, 15, 342/188

(56) References Cited

U.S. PATENT DOCUMENTS 5,200,753 A  4/1993  Janusas .................... 342/14
5,311,192 A  5/1994  Varga et al. .............. 342/188

*Primary Examiner*—Daniel T. Pihulic
(74) *Attorney, Agent, or Firm*—David Kalmbaugh

(57) ABSTRACT

An adaptive cross polarization electronic countermeasures system comprising identical transmit and receive antennas. The transmit antenna is rotated 180 degrees with respect to the receive antenna. The transmit and receive antennas are mounted facing the same direction allowing for reception of an incoming RF signal from a monopulse radar and transmission of the signal back to the monopulse once ECM jamming is applied. The incoming RF signal is separated into vertical and horizontal components by coupling to vertical and horizontal feeds within the receive antenna. Each component is then amplified sequentially through the system and transmitted back to the monopulse radar. At the transmit antenna, the vertical component is transmitted out of the horizontal feed of the transmit antenna 180 degrees out of phase with respect to the feed. The horizontal component is transmitted out of the vertical feed of the transmit antenna with no phase shift. This results in a transmitted electromagnetic field vector which is orthogonal to the input electromagnetic field vector. Discrete vertical and horizontal components are being transmitted back to the monopulse radar with switching occurring every 500 microseconds.

17 Claims, 5 Drawing Sheets

ADAPTIVE CROSS POLARIZATION ELECTRONIC COUNTERMEASURES SYSTEM

BACKGROUND OF THE INVENTION

1. Field of the Invention

The present invention relates generally to electronic countermeasures systems. More specifically, the present invention relates to an adaptive cross polarization jamming system for use on board an aircraft or the like which adapts to the polarization change of an incoming radar pulse from a monopulse radar.

2. Description of the Prior Art

Generally, monopulse radar is used on United States and foreign aircraft and missiles to track targets since monopulse radar is accurate and not as susceptible to electronic countermeasures (ECM) jamming when compared to other types of target scanning radar.

Monopulse radar from, for example, a missile tracking a target compares the phase front of an incoming radio frequency (RF) signal in four separate quadrants of an antenna aperture. The upper and lower quadrants are compared to determine the elevation of the target the missile is tracking, while the right and left quadrants are compared to determine the azimuth of the target. Range from the missile to the target is determined by the time it takes the transmitted pulse to return from the target to the monopulse radar. This allows the monopulse radar to be used to determine direction and range with one pulse (monopulse).

The comparisons of the quadrants of the antenna aperture are performed with sum and difference channels or magic-T's within the monopulse radar system. A lobing pattern created from the resultant sum and difference channels enables the radar system to extract the angle of the RF signal returning from the target.

In the past, systems have been developed to jam enemy monopulse radar to increase the survivability of friendly aircraft, ships during a conflict. These systems are used to jam both enemy aircraft and the missiles the aircraft launch towards friendly aircraft. Without adequate and reliable jamming of the radar, aircraft are susceptible to tracking and intercept by an enemy's weapons systems including their missiles and the aircraft that launch the missiles.

Cross polarization (X-pol) jamming systems are used to induce distortions in the sum and difference channels of the monopulse radar causing the radar to "drive off" the real target. The radar reads an incoming RF signal which is returning from an angle which is not the true angle for the target's present location. This type of jamming occurs when a large orthogonal (X-pol) signal from the target returns to the radar.

Non-adaptive cross polarization jamming systems operate on the principle that the target's radar system is vertically polarized and that the target is flying straight in a level plane. A transmit feed on the jamming system may then be swept a few degrees about horizontal to ensure an orthogonal component is fed into the radar at some time during the sweep.

However, non-adaptive cross polarization radar jamming systems have certain disadvantages in that the jamming sweep is only about the horizontal. The jamming radar can then easily be defeated by changing the polarization of the tracking radar or incorporating a random roll into the tracking system. Rolling the tracking system off vertical causes the orthogonal component to be at an angle other than horizontal. The tracking radar cannot be jammed because it never receives an orthogonal signal.

Adaptive cross polarization jamming systems are configured to adapt to the polarization change of an incoming radar pulse signal. This is accomplished by using a receiver measuring set within the jamming system which measures the polarization of the incoming radar pulse signal. The transmit antenna polarization of the jamming system is then rotated to the orthogonal of the polarization of the incoming radar pulse signal to jam the radar of the tracking aircraft or target.

However, adaptive cross polarization jamming systems also have certain disadvantages in that the receiver measuring set utilized therein is very expensive to implement. The equipment needed to measure the polarization of the incoming signal is also bulky. In addition, adaptive cross polarization jamming systems, which are mechanical systems, can jam only one radar at a time since it can not simultaneously jam multiple polarizations with the same transmit antenna. The response time of a receiver measuring set type of jammer is also slow.

Accordingly, there is a need for a highly efficient, yet relatively simple in design jamming system which will effectively jam an incoming RF signal from a monopulse tracking radar which is tracking irregardless of the polarization of the incoming signal. There is also a need for a jamming system which is light weight, non-bulky and provides for relatively fast response times when jamming multiple monopulse radar systems.

SUMMARY OF THE INVENTION

The present invention overcomes some of the disadvantages of the prior art including those mentioned above in that it comprises a relatively simple and highly efficient adaptive cross polarization electronic countermeasures system which will effectively jam an incoming RF (radio frequency) signal from a monopulse radar tracking a target. The adaptive cross polarization electronic countermeasures system comprises a transmit antenna and a receive antenna which are identical antennas. The transmit antenna is rotated 180 degrees with respect to the receive antenna. The transmit and receive antennas are mounted facing the same direction allowing for reception of an incoming RF signal from a monopulse radar and transmission of the signal back to the monopulse once ECM jamming is applied.

The incoming RF signal is separated into vertical and horizontal components by coupling to vertical and horizontal feeds within the receive antenna. Each component is then amplified sequentially through the adaptive cross polarization electronic countermeasures system and transmitted back to the monopulse radar.

At the transmit antenna, the vertical component is now transmitted out of the horizontal feed of the transmit antenna 180 degrees out of phase with respect to the feed. The horizontal component is transmitted out of the vertical feed of the transmit antenna with no phase shift. This results in a transmitted electromagnetic field vector which is orthogonal to the input electromagnetic field vector.

Discrete vertical and horizontal components are being transmitted back to the monopulse radar with switching occurring every 500 microseconds. The vertical and horizontal components are summed within the monopulse radar producing the resultant orthogonal vector which provides cross polarization jamming.

DETAILED DESCRIPTION OF THE PREFERRED EMBODIMENT

Figure 1:
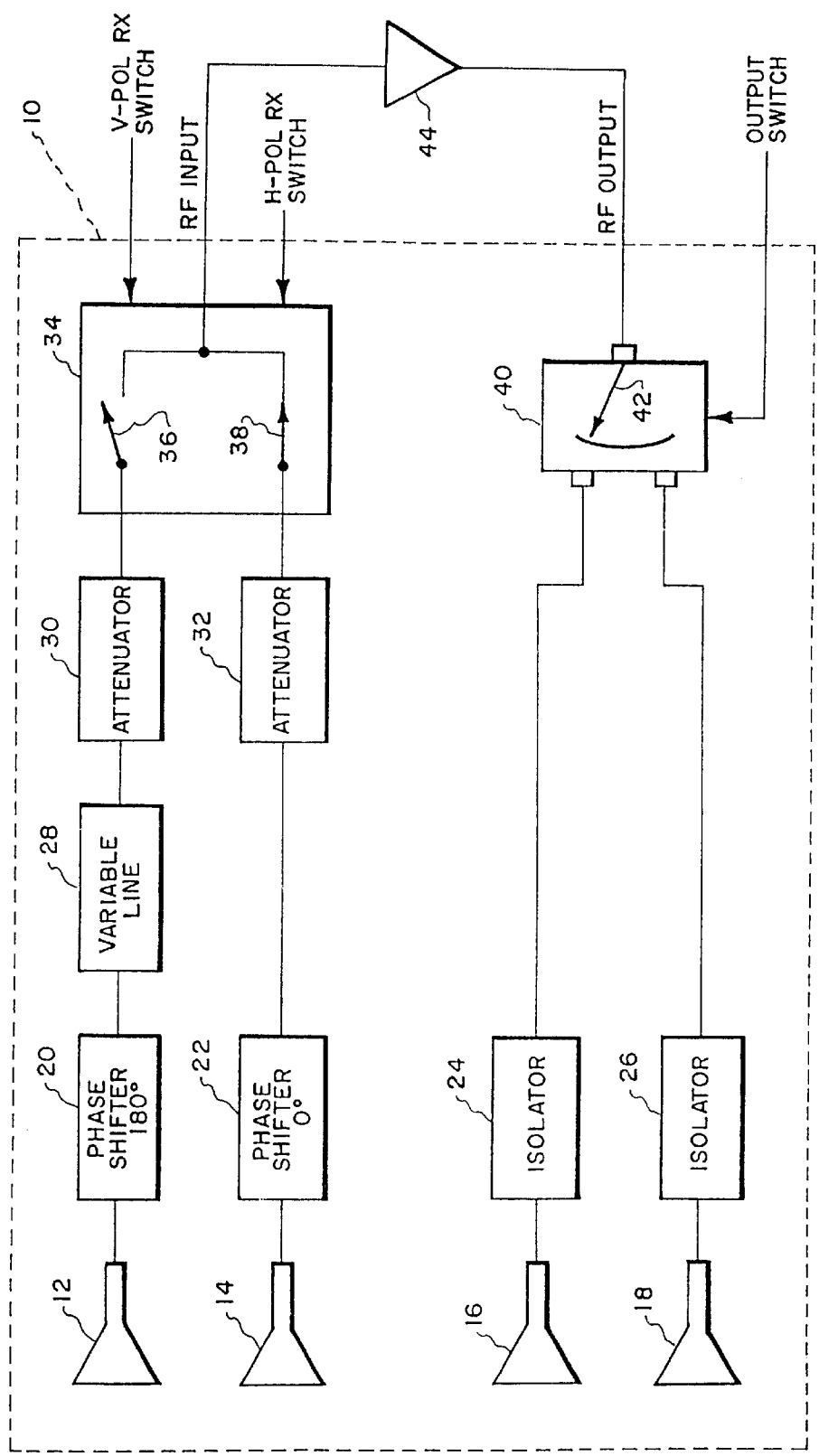
FIG. 1 is a block diagram of an adaptive cross polarization electronic countermeasures system which constitutes a preferred embodiment of the present invention.
Figure 3:
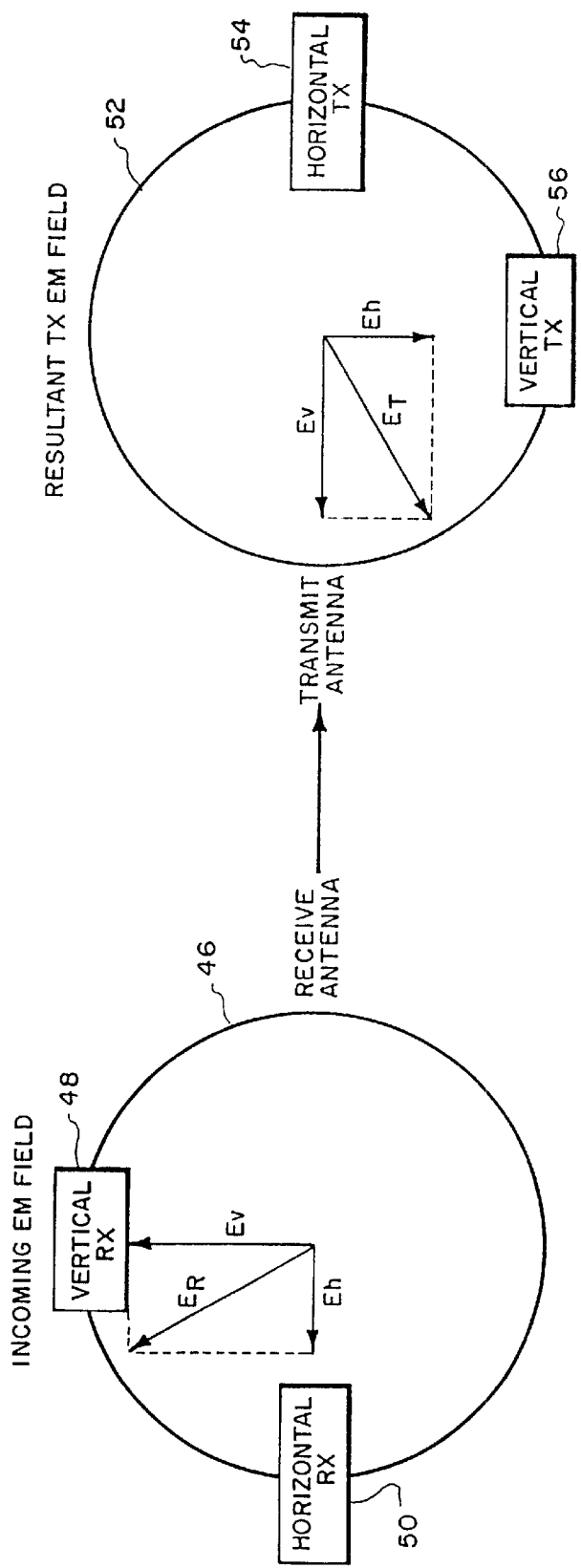
FIG. 3 is a schematic diagram illustrating the processing of incoming monopulse RF signal by the present invention resulting in a transmitted EM field which is orthogonal to the input EM field for the incoming RF signal.

Referring first to FIGS. 1 and 3, there is shown an adaptive cross polarization electronic countermeasures system, designated generally by the reference numeral 10, which is utilized to jam an enemy's monopulse tracking radar on board a missile or the like. As is best illustrated in FIG. 3, adaptive cross polarization electronic countermeasures system 10 includes a receive antenna 46 which has a vertical orthogonal feed 48 and a horizontal orthogonal feed 50. Adaptive cross polarization electronic countermeasures system 10 also includes a transmit antenna 52 again having a vertical orthogonal feed 56 and a horizontal orthogonal feed 54. Receive antenna 46 is adapted to receive an incoming radio frequency (RF) signal from a monopulse tracking radar which is represented by an electromagnetic field vector $E_R$ as shown in FIG. 3. The receive antenna 46 then separates the electromagnetic field for the incoming RF signal into a vertical receive (RX) component $E_v$ and a horizontal receive (RX) component $E_h$ by coupling the signal to the vertical feed 48 and the horizontal feed 50 of antenna 46.

Transmit antenna 52 of adaptive cross polarization electronic countermeasures system 10 is identical to receive antenna 46 and is mounted facing the same direction as receive antenna 46. This allows an incoming RF signal from a missile's or aircraft's monopulse tracking radar to be transmitted by transmit antenna 52 in the same direction as the received RF signal after processing by the circuit of FIG. 1.

Referring to FIG. 3, the transmit antenna 52 of adaptive cross polarization electronic countermeasures system 10 is rotated by 180 degrees with respect to the receive antenna 46 of system 10. This rotation, in turn, rotates vertical feed 56 of antenna 52 one hundred eighty degrees with respect to vertical feed 48 of antenna 46. It also rotates horizontal feed 54 of antenna 52 one hundred eighty degrees with respect to horizontal feed 50 of antenna 46.

Each component $E_v$ and $E_h$ of the incoming RF signal (represented by the EM field vector $E_R$) is amplified sequentially by the circuit of FIG. 1 and then transmitted back to the missile's or aircraft's monopulse tracking radar by transmit antenna 52 of system 10. The vertical receive (RX) component is transmitted from transmit antenna 52 via the horizontal feed 54 of antenna 52 with a one hundred eighty degrees phase shift. The horizontal receive (RX) component is transmitted from antenna 52 via the vertical feed 56 of antenna 52 without a phase shift in the component. The resultant EM field vector $E_T$ of the RF signal transmitted from antenna 52 is orthogonal to the EM field vector $E_R$ of the RF signal received by antenna 46 as shown in FIG. 3. This EM field vector $E_T$ will jam the monopulse tracking radar which transmitted the RF signal received by antenna 46.

At this time it should be noted that vertical feed 48 (FIG. 3) of antenna 46 is identified by the reference numeral 12 in FIG. 1, while horizontal feed 50 (FIG. 3) of antenna 46 is identified by the reference numeral 14 in FIG. 1. Similarly, vertical feed 56 (FIG. 3) of antenna 52 is identified by the reference numeral 16 in FIG. 1, while horizontal feed 54 (FIG. 3) of antenna 52 is identified by the reference numeral 18 in FIG. 1.

Referring to FIGS. 1, 3 and 4, the electrical signal provided by vertical feed 12, which is representative of the vertical received component $E_v$ of the incoming RF signal, is supplied to a phase shifter 20. The electrical signal provided by horizontal feed 14, which is representative of the horizontal received component $E_h$ of the incoming RF signal, is supplied to a phase shifter 22.

Phase shifter 20 shifts the electrical signal from vertical feed 12 by 180 degrees. Phase shifter 22, which is a zero degree phase shifter, shifts the electrical signal from horizontal feed 14 zero degrees, that is there is no phase shift in the signal. The 180 degree phase shifted electrical signal from phase shifter 20 is next supplied to the combination of a variable line 28 and an attenuator 30. Variable line 28 and attenuator 30 are used to match in phase and amplitude the signal channel for processing the vertical received component electrical signal from vertical feed 12 with the signal channel for processing the horizontal received component electrical signal from horizontal feed 14.

At this time it should be noted that the signal channel/path for the vertical received component electrical signal includes vertical feed 12 of receive antenna 46, phase shifter 20, variable line 28, attenuator 30, switch arm 36 of input switch 34, amplifier 44, switch 40, isolator 26 and horizontal feed 18 of transmit antenna 52. The signal channel/path for the horizontal received component electrical signal includes horizontal feed 14 of transmit antenna 52, phase shifter 22, attenuator 32, switch arm 38 of input switch 34, amplifier 44, switch 40, isolator 24 and vertical feed 16 of transmit antenna 52. Variable line 28 is used to make the transmission line path length for each signal channel the same, while attenuators 30 and 32 insure that power losses for each signal channel are identical.

Figure 4A:
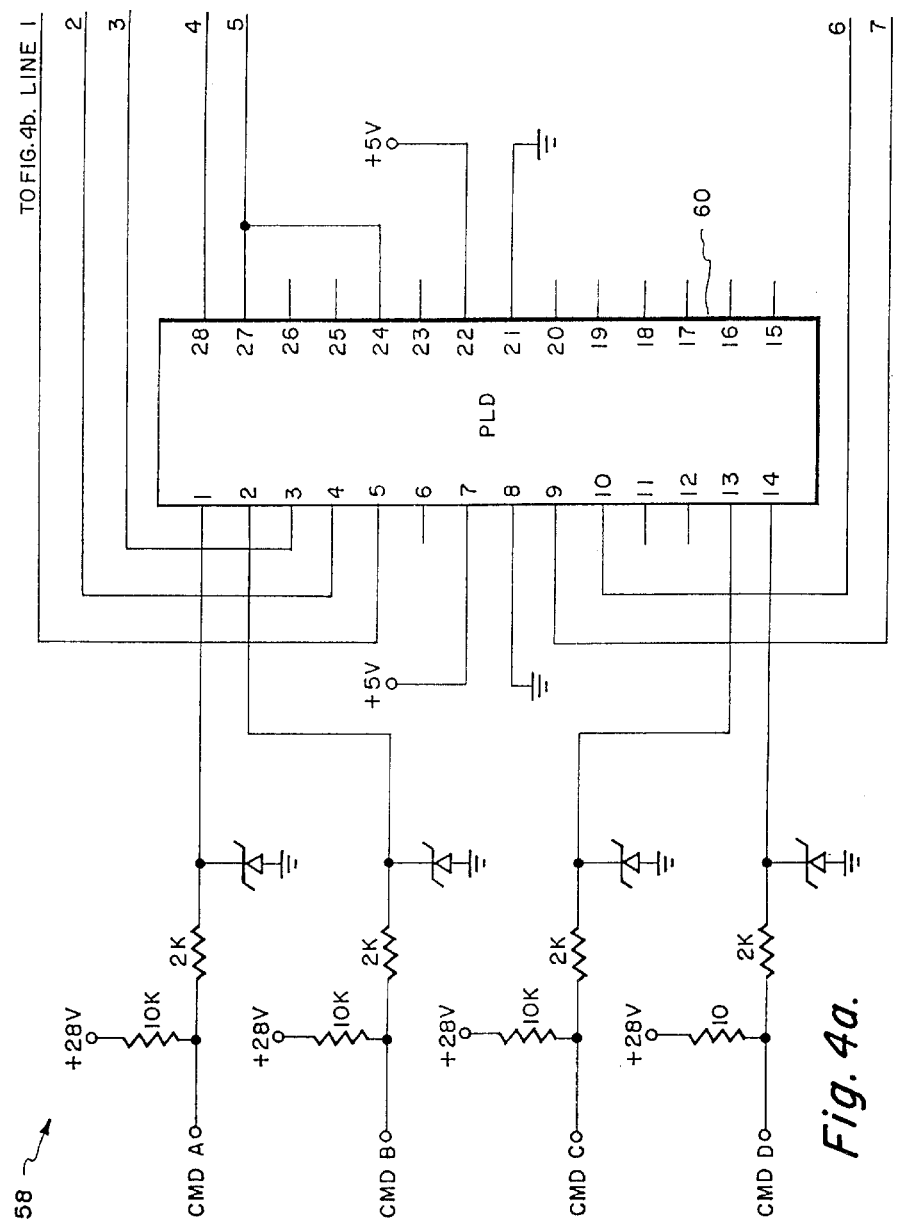
FIGS. 4a and 4b is a detailed electrical schematic diagram of the logic circuitry used to generate the timing waveforms of FIG. 2.
Figure 4B:
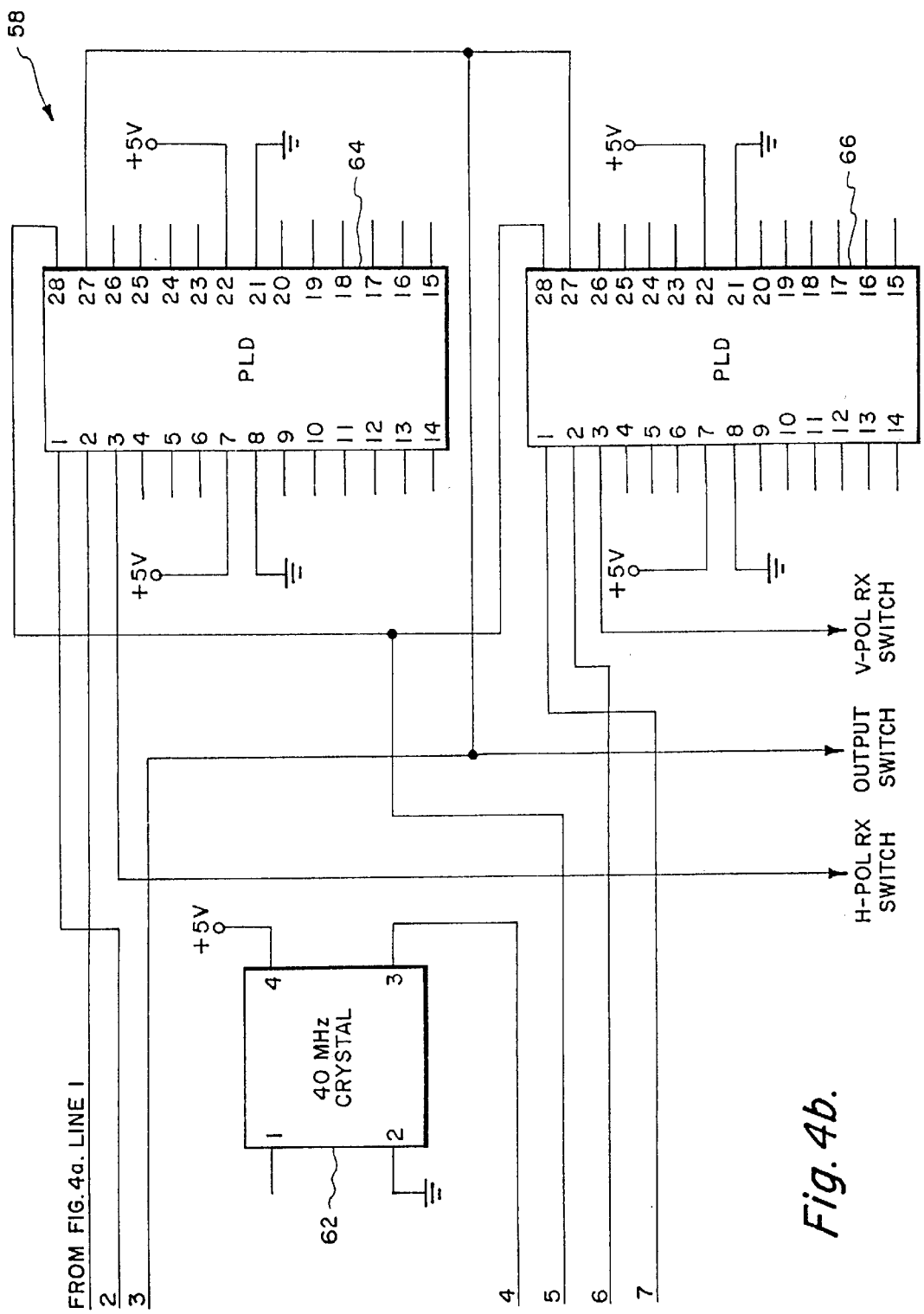

Timing signals (FIGS. 2A, 2B, 2C and 2D) to control the switching of switches 34 and 40 are generated by the logic circuit of FIGS. 4a and 4b.

Referring now to FIGS. 1, 2, 4a and 4b, FIGS. 4a and 4b illustrate the timing signal generating logic circuit, designated generally by the reference numeral 58, which generates the timing signals of FIGS. 2A, 2B, 2C and 2D to control the switching of switches 34 and 40. Logic circuit 50 includes four command/control signal inputs (CMD A, CMD B, CMD C and CMD D) which receive logic signals from the console of an aircraft or the like utilizing the present invention. The CMD A input receives the least significant bit, while the CMD D input receives the most significant bit. When the binary equivalent number provided through the CMD A, CMD B, CMD C and CMD D inputs of logic circuit 50 is five or greater, a programmed array logic device (PLD) 60 is enabled. Thus, if the CMD A and CMD C inputs are at the logic one state and the CMD B and CMD D inputs are at the logic zero state, then programmed array logic device 60 is enabled. However, if the CMD A and CMD B are at the logic one state and the CMD C and CMD D inputs are at the logic zero state, then programmed array logic device 60 is disabled.

There is also connected to input pin 28 of programmed logic device 60 a forty megahertz crystal oscillator 62 which generates and then supplies a 40 MHz system clock signal to programmed array logic device 60. When programmed array logic device 60 is enabled and is receiving the 40 MHz system clock signal, programmed array logic device operates as a counter generating a one KHz clock signal. Each cycle of the one KHz clock signal is generated by a count of 20,000 with fifth percent duty cycle.

The one KHz clock signal is supplied by programmed array logic device 60 to input pin 27 of a programmed array logic device 64 and input pin 27 of a programmed array logic device 66. Similarly, the 40 MHz system clock signal, which is buffered by programmed array logic device 60, is supplied to input pin 28 of programmed array logic device 64 and input pin 28 of programmed array logic device 66.

Programmed array logic device 60 also supplies the one kHz clock signal to output switch 40 (FIG. 1) to alternately provide the horizontal received component electrical signal to vertical feed 16 of transmit antenna 52 and the vertical received component electrical signal to horizontal feed 18 of transmit antenna 52. As is best illustrated by the timing waveforms of FIGS. 2C and 2D, the output of switch 40 is first enabled connecting the horizontal feed 18 of transmit antenna 52 (FIG. 2D) to the amplified RF signal occurring at the output of amplifier 44. The switch arm 42 then moves to the position depicted in FIG. 1, enabling the output of switch 40 which connects vertical feed 16 of transmit antenna 52 (FIG. 2C) to the amplified RF signal occurring at the output of amplifier 44. This results in the horizontal feed 16 of antenna 52 first being enabled for 500 microseconds (H-POL ENABLED, FIG. 2D) followed by the vertical feed 16 of antenna 52 being enabled for 500 microseconds (V-POL ENABLED, FIG. 2C).

Figure 2:
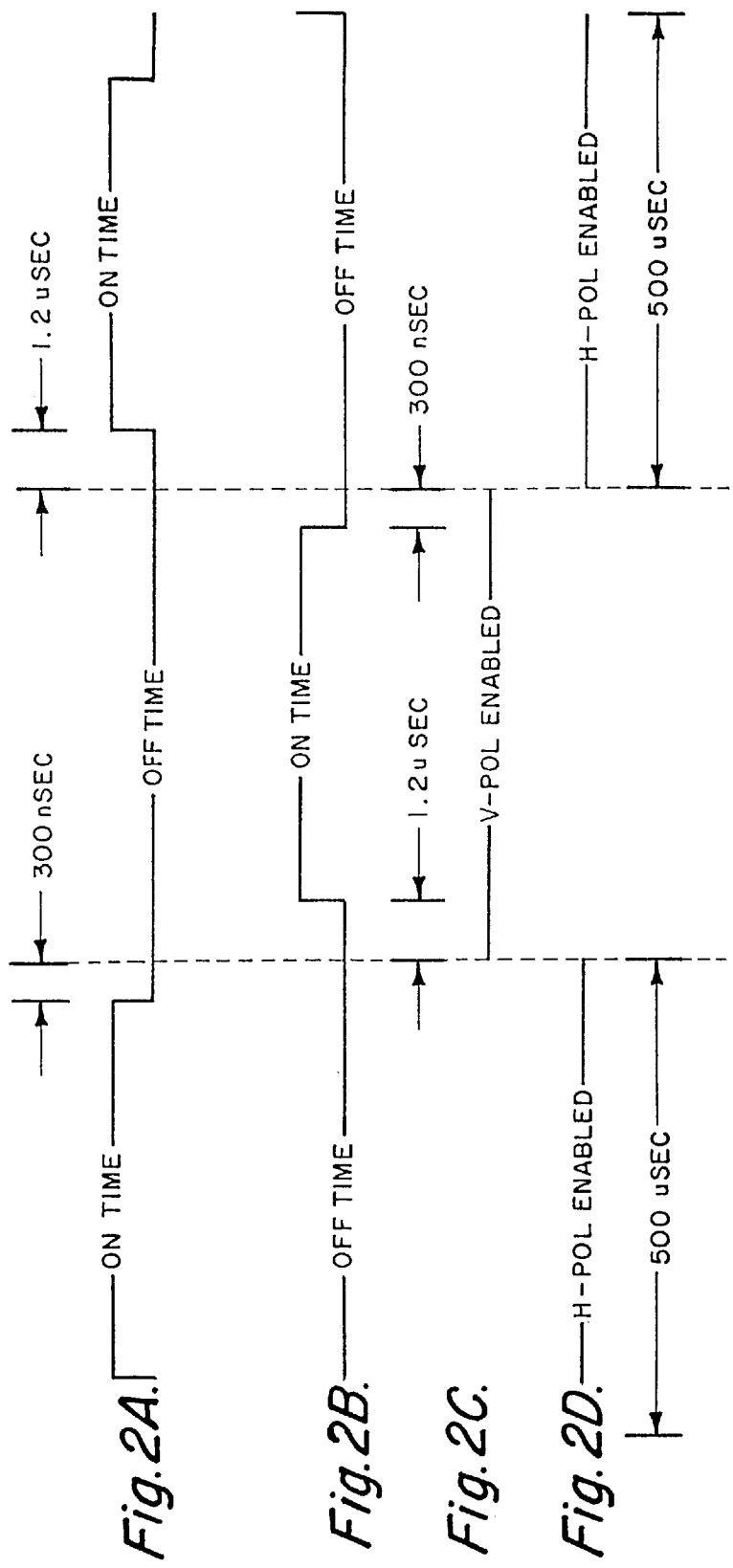
FIGS. 2a–2d are timing diagrams illustrating the timing waveforms for the input switch and the 100 watt output switch of FIG. 1.

Referring again to FIGS. 1, 2, 4a and 4b, progammable array logic device 64, responsive to the 40 MHz system clock signal and the one KHz clock signal, generates the timing signal of FIG. 2B. Programmable array logic device 64, which functions as a counter, turns on its output pin 3 when the count is greater than 100 and less than 19985. The one KHz signal is a negative edge enable signal for programmable array logic device 64 which enables device 64 to count.

In a like manner, programmable array logic device 66, responsive to the 40 MHz system clock signal and the one KHz clock signal, generates the timing signal of FIG. 2A. Programmable array logic device 66, which functions as a counter, turns on its output pin 3 when the count is greater than 100 and less than 19985. The one KHz signal is a positive edge enable signal for programmable array logic device 64 which enables device 64 to count.

As depicted in FIG. 2, whenever the timing signal of FIG. 2A is active high or enabled then switch arm 36 of input switch 34 is closed connecting the vertical orthogonal feed 12 of receive antenna 46 to amplifier 44. Similarly, whenever the timing signal of FIG. 2B is active high, switch arm 38 is closed (as shown in FIG. 1) connecting the horizontal orthogonal feed 14 of receive antenna 46 to amplifier 44.

When switch arm 36 of switch 34 is closed the vertical feed 12 of receive antenna 46 is in an on time cycle (FIG. 2A). This allows the vertical received component electrical signal from vertical feed 12 to pass through switch arm 36 of switch 34 to amplifier 44 which amplifies the signal prior to supplying the amplified signal to switch 40. The amplified vertical component electrical signal then passes through switch 40 and isolator 26, which eliminates noise from switch 40, to the horizontal feed 18 of transmit antenna 52 (FIG. 2D). Transmit antenna 52 then transmits the vertical component $E_v$ of the EM field vector $E_T$ (FIG. 3) of the RF signal to the missile or aircraft monopulse radar.

When switch arm 38 of switch 34 is closed the horizontal feed 14 of receive antenna 46 is in an on time cycle (FIG. 2B). This allows the horizontal received component electrical signal from horizontal feed 14 to pass through switch arm 38 of switch 34 to amplifier 44 which amplifies the signal prior to supplying the amplified signal to switch 40. The amplified horizontal component electrical signal passes through switch 40 and isolator 24, which eliminates noise generated by switch 40. The amplified horizontal component electrical signal is then supplied to the vertical feed 16 of transmit antenna 52 (FIG. 2D). Transmit antenna 52 then transmits the horizontal component $E_h$ of the EM field vector $E_T$ (FIG. 3) of the RF signal to the missile or aircraft monopulse radar.

When transmit antenna 52 is switched from H-POL ENABLED (FIG. 2D) to V-POL ENABLED (FIG. 2C) a time delay of 1.2 usec. (FIG. 2B) occurs before switch arm 38 of switch 34 closes. Similarly, when transmit antenna 52 is switched from V-POL ENABLED (FIG. 2C) to H-POL ENABLED (FIG. 2D) a time delay of 1.2 usec. (FIG. 2A) occurs before switch arm 36 of switch 34 closes. This delay ensures that system 10 has reached a steady state condition before an RF electrical signal input from vertical feed 12 or horizontal feed 14 is enabled.

Both vertical feed 12 (FIG. 2A) and horizontal feed 14 (FIG. 2B) are off for a time period of 300 nanoseconds prior to transmit antenna 52 being switched from H-POL ENABLED (FIG. 2D) to V-POL ENABLED (FIG. 2C) or from V-POL ENABLED (FIG. 2C) to H-POL ENABLED (FIG. 2D). This ensures that all RF signals have propagated through system 10 and that the switching of switch 40 occurs with no RF signals in system 10.

At this time it should be noted that the programmed array logic devices 60, 64 and 66 used in the preferred embodiment of the present invention are each Model EPM 5032 Erasable Programmable Logic Device commercially available from the Altera Corporation of San Jose, Calif. The program used to implement the functions of programmed array logic devices 60, 64 and 66 is the Altera Corporation "MAX +PLUS II development program. Appendix A sets forth the software for each of the programmed array logic devices of logic circuit 58. The SWITCH module of Appendix A implements the functions of programmed array logic device 60 including generating the one KHz clock signal. The TEST25H module of Appendix A implements the functions of programmed array logic device 64, while the TEST25V module of Appendix A implements the functions of programmed array logic device 66.

It should also be noted that programmed array logic device 60 also provides at its output pin 4 a V-Channel enable signal, at its output pin 5 a V-Channel disable signal, at its output pin 9 an H-Channel enable signal and its output pin 10 an H-channel disable signal. Each of these signals is used in testing and a detailed description thereof is not necessary for those skilled in the art to appreciate and have a thorough understand the operation of the present invention whenever the binary number to the CMD A, CMD B, CMD C and CMD D inputs of logic circuit 58 is five or greater.

From the foregoing description, it may readily be seen that the present invention comprises a new, unique and exceedingly useful adaptive cross polarization electronic countermeasures system which constitutes a considerable improvement over the known prior art. Obviously many modifications and variations of the present invention are possible in light of the above teachings. It is therefore to be understood that within the scope of the appended claims the invention may be practiced otherwise than as specifically described.

APPENDIX A

```
module SWITCH
title ' PLD to control the single channel ADAP pod
Mick Benson     NAWCWPNS     CODE 534120E     NOV. 15, 1995 '
SWITCH DEVICE 'P5032A';
declarations
"Input pin assignments    --------------------------------
    xtal        pin 28    istype 'com'; " Input Clock 40 MHz crystal
    xtal_in     pin 27    istype 'com'; "
    m0          pin 1     istype 'com'; " Low bit on 4 bit input
    m1          pin 2     istype 'com'; " 2nd bit on 4 bit
    m2          pin 13    istype 'com'; " 3rd bit on 4 bit
    m3          pin 14    istype 'com'; " 4th bit on 4 bit
    mode = [m3 . . . m0]; " Input for states
Output pin assignments   --------------------------------
    out         pin 3     istype 'reg_d, buffer'; " Driver for 100W switch
    enabv0      pin 4     istype 'reg_d, buffer'; " Enable for V-Channel
    enabv1      pin 5     istype 'reg_d, buffer'; " Disable for V-Channel
    enabh0      pin 9     istype 'reg_d, buffer'; " Enable for H-Channel
    enabh1      pin 10    istype 'reg_d, buffer'; " Disable for H-Channel
    xtal_out    pin 24    istype 'reg_d, buffer';
"Counter pin assignments --------------------------------
    a4,a3,a2,a1,a0        node istype 'reg_d,buffer';
    a9,a8,a7,a6,a5        node istype 'reg_d,buffer';
    a14,a13,a12,a11,a10   node istype 'reg_d,buffer';
    addr = [a14 . . . a0]; " Counter register
equations
    xtal_out    =    (xtal & 1);
    addr.c      =    (xtal_in);
    addr        :=   addr + 1;
    addr.ar     =    ((addr == 20000) # (mode < 5)); " Counts for 5 & over
    out.c       =    (addr == 10000);
    out.d       =    !out.fb;
    out.ap      =    ((mode == 0) # (mode == 1) # (mode == 3)); " OUT to HIGH
    out.ar      =    ((mode == 2) # (mode == 4)); " OUT set to LOW
" Enabling modes
    enabv0 = ((mode == 0) # (mode == 1) # (mode == 2));
    enabv1 = ((mode == 3) # (mode == 4));
    enabh0 = ((mode == 3) # (mode == 4));
    enabh1 = ((mode == 0) # (mode == 1) # (mode == 2));
test_vectors
    ([xtal_in ,mode] —> [enabv1,enabh1,addr,out])
    [ 0,    5    ] —> [0,   0,   0, 0 ];
    [.c.,   6    ] —> [0,   0,   1, 0 ];
    [.c.,   0    ] —> [0,   1,   0, 1 ];
    [.c.,   1    ] —> [0,   1,   0, 1 ];
    [.c.,   2    ] —> [0,   1,   0, 0 ];
    [.c.,   3    ] —> [1,   0,   0, 1 ];
    [.c.,   4    ] —> [1,   0,   0, 0 ];
end;
module TEST25H
title ' PLD to control the single channel ADAP pod
Mick Benson     NAWCWPNS     CODE 534120E     NOV. 15, 1995 '
TEST25H DEVICE 'P5032A';
" This version of the switching will enable the input switch 2.5 us after
" the switch of the output switch. This is to account for the switching
" delay problem inherent in the output switch. The current delay is 2.27 us.
" The switch will be turned off 350 ns prior to switching of the output
"switch.
declarations
"Input pin assignments    --------------------------------
    xtal        pin 28    istype 'com'; " Input Clock 40 MHz crystal "
    clk         pin 27    istype 'com'; " Input from 1 kHz signal
    enab0       pin 1     istype 'com'; " Enable line
    enab1       pin 2     istype 'com'; " Disable line
"Output pin assignments   --------------------------------
    !out        pin 3     istype 'reg_d,buffer'; " Driver for switch
"Counter pin assignments --------------------------------
    a4,a3,a2,a1,a0        node istype 'reg_d,buffer';
    a9,a8,a7,a6,a5        node istype 'reg_d,buffer';
    a14,a13,a12,a11,a10   node istype 'reg_d,buffer';
    addr = [a14 . . . a0]; " Counter register
equations
    addr.c      =    (xtal);
    addr        :=   addr + 1;
    out         =    ((addr >= 100) & (addr <= 19985)); " On 1.2 us after clk
    addr.ar     =    (clk);    "Counter will enable on NEGATIVE edge
" When enable lines are enabled
    out         =    (enab0 == 1); " Makes output line HIGH
    addr.ar     =    ((enab0 == 1) # (enab1 == 1)); " Disables Counter
```

APPENDIX A-continued

```
test vectors
    ([enab0,enab1] —> [out])
    [1,0]      —> [1];
    [0,1]      —> [0];
end;
module TEST25V
title ' PLD to control the single channel ADAP pod
Mick Benson     NAWCWPNS     CODE 534120E    NOV. 15, 1995 '
TEST25V DEVICE 'P5032A';
" This version of the switching will enable the input switch 2.5 us after
" the switch of the output switch. This is to account for the switching
" delay problem inherent in the output switch. The current delay is 2.27 us.
" Switch will be turned off 350 ns prior to switching of the output switch.
declarations
"Input pin assignments      --------------------------------
    xtal        pin 28    istype 'com'; " Input Clock 40 MHz crystal
    clk         pin 27    istype 'com'; " Input from 1 kHz signal
    enab0       pin 1     istype 'com'; " Enable line
    enab1       pin 2     istype 'com'; " Disable line
"Output pin assignments     --------------------------------
    !out        pin 3     istype 'reg_d,buffer'; " Driver for switch
"Counter pin assignments ------------------------------
    a4,a3,a2,a1,a0           node istype 'reg_d,buffer';
    a9,a8,a7,a6,a5           node istype 'reg_d,buffer';
    a14,a13,a12,a11,a10      node istype 'reg_d,buffer';
    addr = [a14 . . . a0]; " Counter register
equations
    addr.c     =    (xtal);
    addr       :=   addr + 1;
    out        =    ((addr >= 100) & (addr <= 19985));
    addr.ar    =    (!clk); " Counter will enable on POSITIVE edge
" When enable lines are enabled
    out              =    (enab0 == 1); " Makes output line
    High addr.ar     =    ((enab0 == 1) # (enab1 == 1)); " Disables Counter
test_vectors
    ([enab0,enab1]     —> [out])
    [1,     0]         —> [1];
    [0,     1]         —> [0];
end;
```

What is claimed is:

1. An adaptive cross polarization electronic countermeasures system for jamming an incoming radio frequency signal from a monopulse tracking radar comprising:

a receive antenna having a vertical feed and a horizontal feed, said receive antenna receiving said incoming radio frequency signal from said monopulse tracking radar, said receive antenna separating said incoming radio frequency signal into a vertical receive component and a horizontal receive component;

said vertical feed of said receive antenna providing a first electrical signal representative of the vertical receive component of said incoming radio frequency signal;

said horizontal feed of said receive antenna providing a second electrical signal representative of the horizontal receive component of said incoming radio frequency signal;

phase shifting means for shifting the phase of said first electrical signal by a predetermined phase shift to provide a phase shifted first electrical signal;

amplifying means for amplifying said phase shifted first electrical signal and said second electrical signal;

a transmit antenna having a vertical feed and a horizontal feed;

timing signal generating means for generating a plurality of timing signals;

switching means, responsive to said plurality of timing signals, alternately providing at a predetermined frequency a first electrical signal path from the vertical feed of said receive antenna to the horizontal feed of said transmit antenna and a second electrical signal path from the horizontal feed of said receive antenna to the vertical feed of said transmit antenna, said phase shifted first electrical signal being transmitted along said first electrical path to the horizontal feed of said transmit antenna, the horizontal feed of said transmit antenna converting said phase shifted first electrical signal to a phase shifted vertical transmit component radio frequency signal;

said second electrical signal being transmitted along said second electrical path to the vertical feed of said transmit antenna, the vertical feed of said transmit antenna converting said second electrical signal to a horizontal transmit component radio frequency signal;

said transmit antenna alternately transmitting to said monopulse tracking radar said phase shifted vertical transmit component radio frequency signal and said horizontal transmit component radio frequency signal at said predetermined frequency.

2. The adaptive cross polarization electronic countermeasures system of claim 1 wherein the predetermined phase shift of said first electrical signal by said phase shifting means is one hundred eighty degrees.

3. The adaptive cross polarization electronic countermeasures system of claim 1 wherein said timing signal generating means comprises first, second and third programmed array logic devices.

4. The adaptive cross polarization electronic countermeasures system of claim 1 wherein said timing signal generating means comprises:

first, second and third counters connected to said switching means, said first counter being connected to said second counter and said third counter; and a clock signal generator connected to said first counter.

5. The adaptive cross polarization electronic countermeasures system of claim 1 wherein said predetermined frequency is one kilohertz.

6. An adaptive cross polarization electronic countermeasures system for jamming an incoming radio frequency signal from a monopulse tracking radar comprising:

a receive antenna having a vertical feed and a horizontal feed, said receive antenna receiving said incoming radio frequency signal from said monopulse tracking radar, said receive antenna separating said incoming radio frequency signal into a vertical receive component and a horizontal receive component;

said vertical feed of said receive antenna providing a first electrical signal representative of the vertical receive component of said incoming radio frequency signal;

said horizontal feed of said receive antenna providing a second electrical signal representative of the horizontal receive component of said incoming radio frequency signal;

a phase shifter connected to said vertical feed of said receive antenna for shifting the phase of said first electrical signal by one hundred eighty degrees to provide a phase shifted first electrical signal;

amplifying means for amplifying said phase shifted first electrical signal and said second electrical signal;

a transmit antenna having a vertical feed and a horizontal feed;

timing signal generating means for generating a plurality of timing signals;

switching means, responsive to said plurality of timing signals, alternately providing at a predetermined frequency a first electrical signal path from the vertical feed of said receive antenna to the horizontal feed of said transmit antenna and a second electrical signal path from the horizontal feed of said receive antenna to the vertical feed of said transmit antenna, said phase shifted first electrical signal being transmitted along said first electrical path to the horizontal feed of said transmit antenna, the horizontal feed of said transmit antenna converting said phase shifted first electrical signal to a phase shifted vertical transmit component radio frequency signal;

said second electrical signal being transmitted along said second electrical path to the vertical feed of said transmit antenna, the vertical feed of said transmit antenna converting said second electrical signal to a horizontal transmit component radio frequency signal;

a variable line connected between said phase shifter and said switching means, said variable line ensuring that a transmission line path length for said first electrical path is identical to a transmission line path length for said second electrical signal path;

said transmit antenna alternately transmitting to said monopulse tracking radar said phase shifted vertical transmit component radio frequency signal and said horizontal transmit component radio frequency signal at said predetermined frequency;

said horizontal feed of said transmit antenna being rotated one hundred eighty degrees with respect to said horizontal feed of said receive antenna, said vertical feed of said transmit antenna being rotated one hundred eighty degrees with respect to said vertical feed of said receive antenna.

7. The adaptive cross polarization electronic countermeasures system of claim 6 wherein said timing signal generating means comprises first, second and third programmed array logic devices.

8. The adaptive cross polarization electronic countermeasures system of claim 6 wherein said timing signal generating means comprises:

first, second and third counters connected to said switching means, said first counter being connected to said second counter and said third counter; and a clock signal generator connected to said first counter.

9. The adaptive cross polarization electronic countermeasures system of claim 6 wherein said predetermined frequency is one kilohertz.

10. The adaptive cross polarization electronic countermeasures system of claim 6 further comprising an attenuator having an input connected to an output of said variable line and an output connected to said switching means.

11. The adaptive cross polarization electronic countermeasures system of claim 6 further comprising:

a zero degrees phase shifter having an input connected to the horizontal feed of said receive antenna and an output;

an attenuator having an input connected to the output of said zero degrees phase shifter and an output connected to said switching means.

12. The adaptive cross polarization electronic countermeasures system of claim 6 further comprising:

a first isolator having an input connected to said switching means and an output connected to the vertical feed of said transmit antenna; and a second isolator having an input connected to said switching means and an output connected to the horizontal feed of said transmit antenna.

13. An adaptive cross polarization electronic countermeasures system for jamming an incoming radio frequency signal from a monopulse tracking radar comprising:

a receive antenna having a vertical feed and a horizontal feed, said receive antenna receiving said incoming radio frequency signal from said monopulse tracking radar, said receive antenna separating said incoming radio frequency signal into a vertical receive component and a horizontal receive component;

said vertical feed of said receive antenna providing a first electrical signal representative of the vertical receive component of said incoming radio frequency signal;

said horizontal feed of said receive antenna providing a second electrical signal representative of the horizontal receive component of said incoming radio frequency signal;

a one hundred eighty degrees phase shifter having an input connected to said vertical feed of said receive antenna and an output, said one hundred eighty degrees phase shifter shifting the phase of said first electrical signal by one hundred eighty degrees to provide a phase shifted first electrical signal;

amplifying means for amplifying said phase shifted first electrical signal and said second electrical signal;

a transmit antenna having a vertical feed and a horizontal feed;

timing signal generating means for generating a plurality of timing signals;

switching means, responsive to said plurality of timing signals, alternately providing at a predetermined frequency a first electrical signal path from the vertical feed of said receive antenna to the horizontal feed of said transmit antenna and a second electrical signal path from the horizontal feed of said receive antenna to the vertical feed of said transmit antenna, said phase shifted first electrical signal being transmitted along said first electrical path to the horizontal feed of said transmit antenna, the horizontal feed of said transmit antenna converting said phase shifted first electrical signal to a phase shifted vertical transmit component radio frequency signal;

said second electrical signal being transmitted along said second electrical path to the vertical feed of said transmit antenna, the vertical feed of said transmit antenna converting said second electrical signal to a horizontal transmit component radio frequency signal;

a variable line having an input connected to the output of said one hundred eighty degrees phase shifter and an output, said variable line ensuring that a transmission line path length for said first electrical path is identical to a transmission line path length for said second electrical signal path;

a first attenuator having an input connected to the output of said variable line and an output connected to said switching means;

a zero degrees phase shifter having input connected to the horizontal feed of said receive antenna and an output;

a second attenuator having an input connected to the output of said zero degrees phase shifter and an output connected to said switching means;

said transmit antenna alternately transmitting to said monopulse tracking radar said phase shifted vertical transmit component radio frequency signal and said horizontal transmit component radio frequency signal at said predetermined frequency;

said horizontal feed of said transmit antenna being rotated one hundred eighty degrees with respect to said horizontal feed of said receive antenna, said vertical feed of said transmit antenna being rotated one hundred eighty degrees with respect to said vertical feed of said receive antenna.

14. The adaptive cross polarization electronic countermeasures system of claim 13 wherein said timing signal generating means comprises first, second and third programmed array logic devices.

15. The adaptive cross polarization electronic countermeasures system of claim 13 wherein said timing signal generating means comprises:

first, second and third counters connected to said switching means, said first counter being connected to said second counter and said third counter; and a clock signal generator connected to said first counter.

16. The adaptive cross polarization electronic countermeasures system of claim 13 wherein said predetermined frequency is one kilohertz.

17. The adaptive cross polarization electronic countermeasures system of claim 13 further comprising:

a first isolator having an input connected to said switching means and an output connected to the vertical feed of said transmit antenna; and a second isolator having an input connected to said switching means and an output connected to the horizontal feed of said transmit antenna.

* * * * *